Nov. 18, 1947.  L. J. MAIETTA  2,431,181
FISH LURE
Filed March 2, 1946  2 Sheets-Sheet 1

Inventor
Louis J. Maietta

By Clarence A. O'Brien
and Harvey B. Jacobson
Attorneys

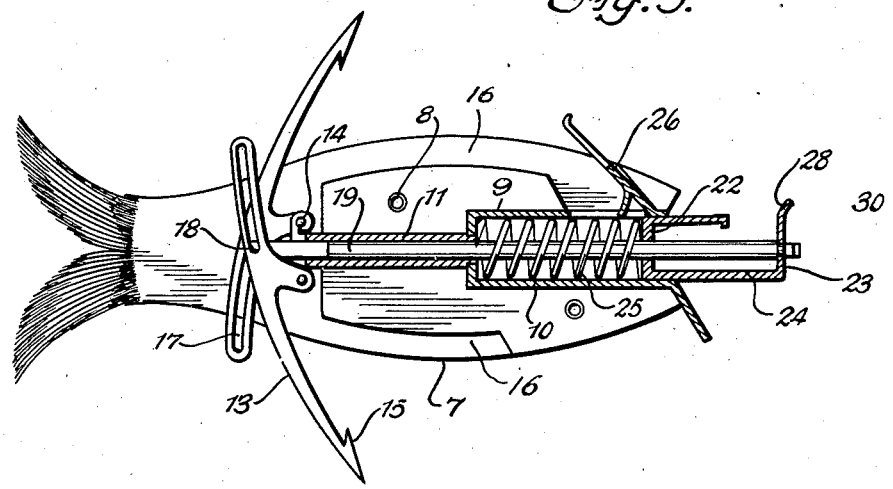
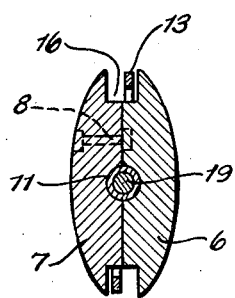
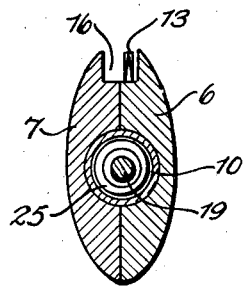

Patented Nov. 18, 1947

2,431,181

UNITED STATES PATENT OFFICE 2,431,181

FISH LURE

Louis J. Maietta, Bristol, Conn.

Application March 2, 1946, Serial No. 651,492

2 Claims. (Cl. 43—35)

The present invention relates to new and useful improvements in fish lures or artificial bait, commonly known as plugs and the invention has for its primary object to provide a self catching lure of this character.

More specifically, the invention resides in providing a body in which a plurality of hooks are normally concealed in a retracted position together with spring means for projecting the hooks laterally from the body into a fish's mouth together with trip means for releasing the spring to project the hooks and in which the trip means is actuated by the action of the fish biting on the lure.

An important object of the invention is to provide a fish lure of this character in which the hooks are normally maintained in a retracted position to prevent engagement with the clothing of a person or other objects while the lure is being carried as well as to prevent entanglement of the hooks with weeds and other obstructions in the water while the lure is being drawn therethrough and in which the hooks are projected from the lure for catching the fish by the action of the fish grabbing the lure.

A further object of invention is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 5 is a similar view showing the hooks in projected position and

Figure 1:
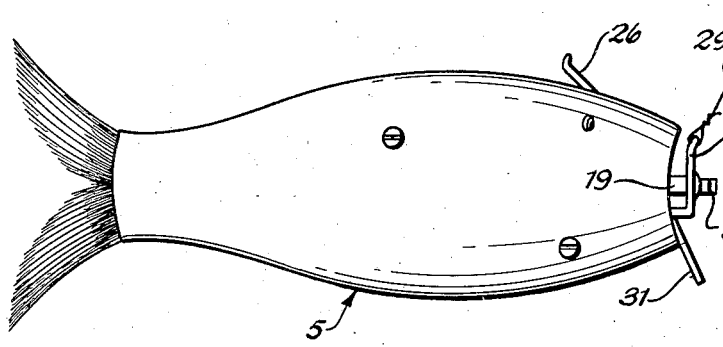
Figure 1 is a side elevational view.
Figure 2:
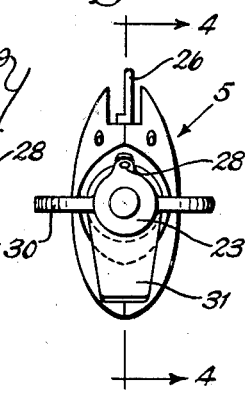
Figure 2 is a front elevational view.
Figure 3:
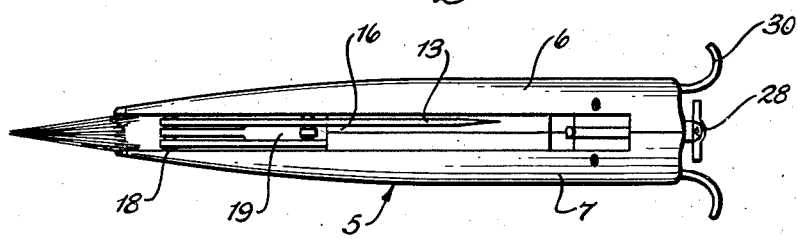
Figure 3 is a top plan view.
Figure 4:
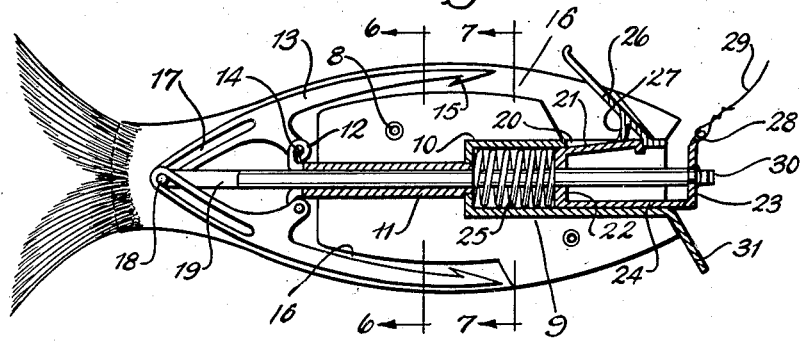
Figure 4 is a longitudinal sectional view taken on a line 4—4 of Figure 2.

Figures 6 and 7 are transverse sectional views taken respectively on the lines 6—6 and 7—7 of Figure 4.

Referring now to the drawings in detail, wherein for the purpose of illustration I have disclosed a preferred embodiment of the invention, the numeral 5 designates the body of the lure which is shaped generally to conform to the contour of a fish and composed of a pair of longitudinal sections 6 and 7 preferably constructed of buoyant material and secured to each other in side-by-side relation by bolts or the like 8.

The confronting faces of the sections 6 and 7 are recessed as shown at 9 to provide a chamber in the body in which a longitudinally extending cylindrical member 10 is positioned having a tube 11 projecting from its rear end. The rear end of the tube 11 is formed with a pair of eyes 12 at diametrically opposite sides of the tube to each of which a fish hook 12 is pivotally attached intermediate the ends of the hook by means of pins 14. Each of the hooks is formed at its outer end with a barb 15 and the hooks are normally maintained in a retracted position in longitudinally extending grooves 16 formed in the upper and lower surfaces of the body 5, the hooks extending forwardly from their pivots 14.

The rear ends of the hooks are formed with longitudinally extending slots 17 in which a pin 18 is received, the pins projecting laterally from opposite sides of the rear end of a plunger 19 slidably mounted in the tube 11.

The front upper portion of the cylinder 10 is formed with a longitudinally extending slot 20 in which the free end of a spring catch 21 is received, the catch being integrally formed or otherwise suitably connected to one edge of a disc 22 slidably mounted in the front end of the cylinder 10. A second disc 23 is secured to the front end of the plunger 19 and is connected to the disc 22 by a bar 24. A coil spring 25 is positioned in the cylinder 10 behind the disc 22 and bears against the rear end of the cylinder to project the discs 22 and 23 and the plunger 19 forwardly when released by the catch 21.

A resilient trigger 26 is integrally formed or otherwise suitably connected to the front portion of the cylinder 10 and projects upwardly and rearwardly through the upper groove 16 in the body 5 with the upper end of the trigger extending outwardly of the body as shown to advantage in Figures 4 and 5 of the drawings. The under side of the trigger 26 is formed with a rigid tongue 27 which bears against the catch 21 and is adapted to release the catch upon a downward movement of the trigger in a direction inwardly of the body 5.

The upper edge of the front disc 23 is formed with an apertured lip 28 to which a fish line 29 is attached and fingers 30 project laterally outwardly at diametrically opposite sides of the disc 23 for finger gripping engagement by a person to move the discs 22 and 23 inwardly of the cylinder 10 into a position for the engagement of the catch 21 in the opening 20 thereof.

A plate 31 is formed at the front end of the cylinder 10 and projects downwardly and forwardly of the body 5 to cause a twisting and wiggling motion of the lure while being drawn through the water.

In the operation of the device with the sections 6 and 7 of the body connected to each other and with the hook actuating mechanism mounted therein as shown in Figure 4 of the drawings, the discs 22 and 23 are normally moved inwardly or rearwardly of the cylinder 10 to compress the spring 25 whereupon the plunger 19 is also moved rearwardly to retract the hooks 13 in the grooves 16 in the upper and lower portions of the body.

When a fish grabs the lure, the trigger 26 will be depressed, thereby depressing the catch 21 to release the catch from the slot 20 of the cylinder, whereupon the spring 25 will project the discs 22 and 23 and the plunger 19 forwardly and result in an outward swinging movement of the hooks 13 into the position as shown in Figure 5 of the drawings. The hooks 13 will then penetrate into the mouth of the fish to prevent disengagement or release of the fish from the lure.

In order to disengage the fish from the lure, the finger pieces 30 are moved inwardly or rearwardly, thereby moving the plunger 19 rearwardly and causing a retracting movement of the hooks.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim is:

1. A fish lure comprising a body having a pair of longitudinally extending grooves in its surface, a pair of fish hooks pivoted in the body for movement from a concealed position in the grooves to an outwardly projected position, a cylindrical member in the body having a longitudinal slot, a rod slidably mounted in the cylindrical member and connected at its rear end to said hooks, a spring catch carried by the rod and engageable in the slot to hold the rod in its rearward position, spring means urging the rod forwardly to project the hooks, and a trigger arranged to release the catch to place the rod under the influence of the spring means, said trigger being arranged for actuation by a fish grabbing the lure.

2. A fish lure comprising a body having a pair of longitudinally extending grooves in its surface, a pair of fish hooks pivoted in the body for movement from a concealed position in the grooves to an outwardly projected position, a cylindrical member in the body having a longitudinal slot, and also having a plate projecting downwardly and forwardly at its front end outwardly of the body to agitate the lure when drawn through the water, a rod slidably mounted in the cylindrical member and connected at its rear end to said hooks, a spring catch carried by the rod and engageable in the slot to hold the rod in its rearward position, spring means urging the rod forwardly to project the hooks, and a trigger arranged to release the catch to place the rod under the influence of the spring means, said trigger being arranged for actuation by a fish grabbing the lure.

LOUIS J. MAIETTA.

REFERENCES CITED

The following references are of record in the file of this patent:

UNITED STATES PATENTS

| Number | Name | Date |
| --- | --- | --- |
| 1,465,750 | Borg | Sept. 11, 1923 |
| 1,209,237 | Warren | Dec. 19, 1916 |